US008417058B2

(12) United States Patent
Tardif

(10) Patent No.: US 8,417,058 B2
(45) Date of Patent: Apr. 9, 2013

(54) ARRAY OF SCANNING SENSORS

(75) Inventor: John A. Tardif, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 390 days.

(21) Appl. No.: 12/883,012

(22) Filed: Sep. 15, 2010

(65) Prior Publication Data

US 2012/0063637 A1 Mar. 15, 2012

(51) Int. Cl.
*G06K 9/20* (2006.01)
(52) U.S. Cl.
USPC .......................................................... 382/282
(58) Field of Classification Search ............. 235/462.32; 250/334; 348/39, 230.1, 272, 294, 298, 308, 348/E5.03, E5.092; 352/94; 359/630; 377/10; 382/282; 396/274, 431; 399/231
See application file for complete search history.

(56) References Cited

U.S. PATENT DOCUMENTS

| | | | |
|---|---|---|---|
| 6,256,033 B1 | 7/2001 | Nguyen | |
| 6,512,838 B1 | 1/2003 | Rafii et al. | |
| 6,539,931 B2 | 4/2003 | Trajkovic et al. | |
| 6,674,877 B1 | 1/2004 | Jojic et al. | |
| 6,950,534 B2 | 9/2005 | Cohen et al. | |
| 7,187,405 B2 | 3/2007 | Poplin et al. | |
| 7,227,526 B2 | 6/2007 | Hildreth et al. | |
| 7,308,112 B2 | 12/2007 | Fujimura et al. | |
| 7,317,836 B2 | 1/2008 | Fujimura et al. | |
| 7,367,887 B2 | 5/2008 | Watabe et al. | |
| 7,428,378 B1 | 9/2008 | Warpakowski Furlan | |
| 7,590,262 B2 | 9/2009 | Fujimura et al. | |
| 2006/0256397 A1* | 11/2006 | Cui | 358/450 |
| 2007/0040913 A1* | 2/2007 | Fisher et al. | 348/218.1 |
| 2008/0152191 A1 | 6/2008 | Fujimura et al. | |
| 2009/0021612 A1 | 1/2009 | Hamilton, Jr. et al. | |
| 2009/0118600 A1 | 5/2009 | Ortiz et al. | |
| 2009/0141933 A1 | 6/2009 | Wagg | |
| 2009/0153710 A1* | 6/2009 | John | 348/296 |
| 2009/0221368 A1 | 9/2009 | Yen et al. | |
| 2009/0268055 A1 | 10/2009 | Hamilton, Jr. et al. | |
| 2010/0090007 A1 | 4/2010 | Wang et al. | |
| 2010/0128137 A1 | 5/2010 | Guidash | |

FOREIGN PATENT DOCUMENTS

WO  WO2009059065  5/2009

OTHER PUBLICATIONS

International Search Report and Written Opinion dated Mar. 13, 2012 in International Patent Application No. PCT/US2011/047816.

(Continued)

*Primary Examiner* — Gregory F Cunningham
(74) *Attorney, Agent, or Firm* — Vierra Magen Marcus LLP

(57) ABSTRACT

An array of image sensors is arranged to cover a field of view for an image capture system. Each sensor has a field of view segment which is adjacent to the field of view segment covered by another image sensor. The adjacent field of view (FOV) segments share an overlap area. Each image sensor comprises sets of light sensitive elements which capture image data using a scanning technique which proceeds in a sequence providing for image sensors sharing overlap areas to be exposed in the overlap area during the same time period. At least two of the image sensors capture image data in opposite directions of traversal for an overlap area. This sequencing provides closer spatial and temporal relationships between the data captured in the overlap area by the different image sensors. The closer spatial and temporal relationships reduce artifact effects at the stitching boundaries, and improve the performance of image processing techniques applied to improve image quality.

20 Claims, 9 Drawing Sheets

OTHER PUBLICATIONS

Wilburn, Bennett et al., "High-Speed Videography Using a Dense Camera Array", Department of Electrical Engineering, Department of Computer Science, Stanford University, 2004, Retrieved from the Internet: <http://citeseerx.ist.psu.edu/viewdoc/download;jsessionid=5CCB08CF1EBA85B47EC732E7F51FDD88?doi=10.1.1.1.5435&rep=rep1&type=pdf>.

Bradley, Derek, et al., "Synchronization and Rolling Shutter Compensation for Consumer Video Camera Arrays", University of British Columbia, 2009, Retrieved from the Internet: <http://www.derekbradley.ca/Papers/procams09_CamSync.pdf>.

Qian, et al., "A Gesture-Driven Multimodal Interactive Dance System," 2004 IEEE International Conference on Multimedia and Expo (ICME), 2004, pp. 1579-1582.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

* cited by examiner

ARRAY OF SCANNING SENSORS

BACKGROUND

Image capture devices may be categorized as capturing images by either a global shutter or capture technique or a scanning technique. A global capture technique, such as performed by a charge-coupled device (CCD), captures an entire image sensing array of data from an image at the same time. To capture an image or image data means to receive light and store image data representing the light received. While global capture techniques avoid motion distortion artifacts, one disadvantage is a light gathering pixel is required to hold onto its value until it has been readout which can result in an increased refresh period and therefore, a decreased refresh rate compared with a sensor using a scanning technique. Furthermore, increased semiconductor area for a second charge storage element is needed for each pixel so that the pixel charge can be offloaded as soon as possible. The latter is the principle used by an interline CCD sensor which means it has a roughly double area penalty.

Some image capture devices use scanning sensors. One example of a scanning sensor is a typical complementary metal oxide semiconductor (CMOS) sensor device found in consumer electronics like video cameras. The CMOS sensor uses a rolling shutter or capture technique which captures different portions of a frame of image data at different times. An interline CMOS sensor includes parallel lines of light sensitive pixels and their accompanying storage circuitry. The exposures for successive lines can have significant overlap. For example, with a 30 Hz refresh rate, there can be a 30 ms exposure window for each line resulting in just about all lines being actively exposed at the same time in the same frame. However, the readout of the lines is serialized or rolling (i.e. one at a time). While a line is being readout, adjacent lines to be read out later are still capturing, meaning receiving and storing light, of a scene that is changing over time so spatial and temporal discontinuities result.

In another example of a scanning sensor, an external shutter can be used with a CMOS sensor, and the shutter can control exposure of each line of pixels for capture of image data in succession in a direction of traversal during a frame while blocking the other lines. Thus, the lines capture different portions of the image frame at different points in time, in effect "rolling" through the frame. A rolling shutter or rolling capture technique provides an advantage in terms of refresh rate in that readout is continuous and semiconductor area can be smaller as additional storage pixels are not needed.

Other examples of scanning sensors include image sensors as used in analog Cathode Ray Tube (CRT) systems, laser scanners and other systems where a beam activates a light sensitive area of a sensor in a sequential manner. The image sensors are scanned in a scanning pattern. An example of a scanning pattern is a raster scan order or a raster order. For example, an analog cathode ray tube (CRT) has an image sensor across which a beam moves in horizontal lines, and the image sensor generates analog signals representing the image. In digital systems using raster scanning technology, the image sensor can include pixels activated in a scanning pattern.

As mentioned above the time differences of the captures in the scanning or rolling techniques introduce image artifacts, particularly when the image subject is moving. Differences in lighting, skew, and wobble are all known artifacts of the time differences of capture during the frame.

Multiple image capture devices with image sensors or an array of image sensors can be used to capture a scene, usually to provide a larger total field of view or to improve total resolution or refresh rate by having each sensor in the area focus on a smaller field of view. The field of views (FOV) of at least two image sensors can overlap. For example, a first FOV of sensor can have its bottom border overlap the top of a second FOV of the other sensor. Images from the two sensors may be stitched together to produce a composite image. However, when the sensors are operate by a scanning technique such as rolling capture (vertical succession in this example), the first and second sensors start scanning their respective images top down at the same time. Thus, the sensor focused on a bottom portion of a scene captures the rows in the overlapping border area at the start of a frame, but the sensor focused on the top portion of the scene captures the rows in the overlapping border area at the end of a frame. Where there are possibly moving images in the frame, artifacts further complicate stitching together of the areas of overlap in the image data from the first and second image sensors.

SUMMARY

Technology is provided for image capture and processing of images by an array of image sensors using a scanning technique. An example of a scanning technique is a rolling capture technique. The term rolling shutter technique is sometimes used, and this technique is a type of rolling capture technique. An array of image sensors is arranged to cover a field of view, where each sensor has a field of view segment which is adjacent to the field of view segment covered by another image sensor. Each set of adjacent field of view (FOV) segments share an overlap area.

In one embodiment, a plurality of image sensors including a first image sensor and a second image sensor which cover adjacent FOV segments which share a first overlap area. Each of the image sensors includes respective sets of light sensitive elements which are traversed to capture image data in a direction of traversal of its respective sets of light sensitive elements. The first and second image sensors capture image data in the first overlap area during a same overlap time period during which the first and second image sensors use opposite directions of traversal of their respective sets of light sensitive elements. This traversal in opposite directions provides closer spatial and temporal relationships between the data captured in the overlap area by the different image sensors. The closer spatial and temporal relationships reduce artifact effects at the overlap boundaries thereby reducing stitching time and complexity.

The captured image segments are stitched together into a composite frame image, or scene. As necessary, image processing techniques such as error correction techniques for artifact reduction and blending techniques are performed on the image data in the overlap area to improve the image quality. These techniques can use image data from the overlap area of adjacent field of view segments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology for image processing of image data captured using a scanning technique in accordance with this specification are further described with reference to the accompanying drawings.

DETAILED DESCRIPTION

The figures below illustrate examples of embodiments of the technology for image capture and image processing or illustrative systems in which the technology can be used. An image capture system can include one or more image sensors within one camera unit or the image sensors can be in different camera units positioned so that all image sensors together obtain a composite scene. Each individual sensor may capture a portion of the scene, referred to herein as a field of view (FOV) segment. As explained below, the different image sensors may be arranged in different configurations, but image sensors capturing adjacent field of view segments share an overlap area where the two field of view segments cover the same spatial area of the scene.

As will be described in reference to the figures below, at least two image sensors having adjacent FOV segments capture image data in an overlap area during a same overlap time period during which these two image sensors traverse their light sensitive elements in opposite directions. The result, as will be shown below, is an overlap area with data having a closer temporal relationship between the FOV segments than when both image sensors traverse or roll in the same direction as discussed in the background. Furthermore, the scene subject matter or content captured in the FOV segments will be closer as well due to the closer temporal relationship. In other words, moving subject matter in the overlap area will be captured by the first and second image sensors at nearly the same time, so spatial correlation of subject matter in these FOV segments improves. Thus, there will be fewer discontinuities or artifacts due to motion or they will be of a smaller magnitude.

Figure 1:
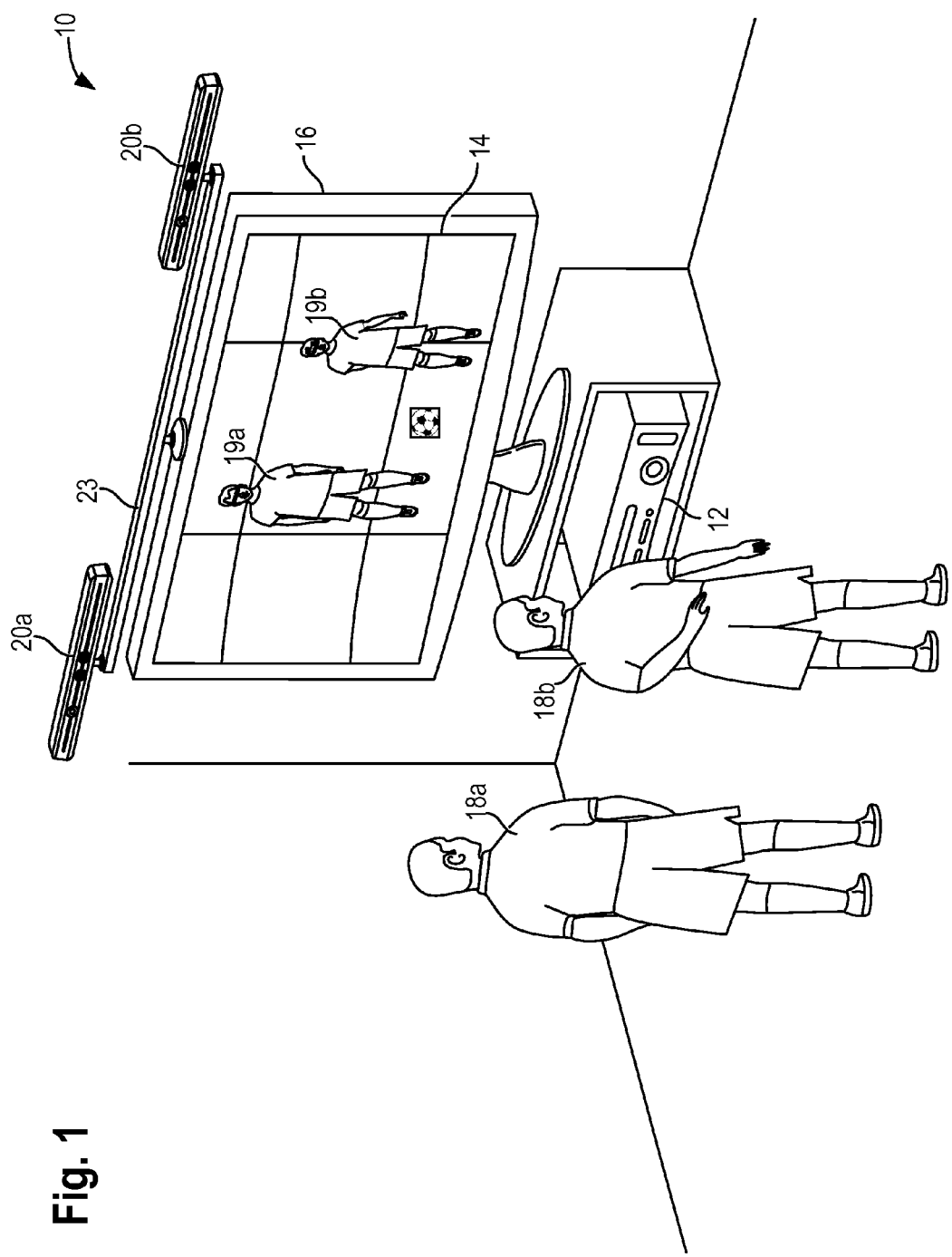
FIG. 1 illustrates an example embodiment of a target recognition, analysis, and tracking system with users participating in a game.

Referring initially to FIG. 1, the hardware for implementing the present technology includes a target recognition, analysis, and tracking system 10 which may be used to recognize, analyze, and/or track one or more human targets such as the users 18. Embodiments of the target recognition, analysis, and tracking system 10 include a computing environment 12 for executing a gaming or other application. The computing environment 12 may include hardware components and/or software components such that computing environment 12 may be used to execute applications such as gaming and non-gaming applications. In one embodiment, computing environment 12 may include a processor such as a standardized processor, a specialized processor, a microprocessor, or the like that may execute instructions stored on a processor readable storage device for performing processes described herein.

The system 10 further includes one or more capture devices 20 for capturing image data relating to one or more users and/or objects sensed by the capture device. FIG. 1 shows a pair of capture devices 20a and 20b. In embodiments, the capture device 20 may be used to capture information relating to movements and gestures of one or more users, which information is received by the computing environment and used to render, interact with and/or control aspects of a gaming or other application. Examples of the computing environment 12 and capture device 20 are explained in greater detail below.

Embodiments of the target recognition, analysis, and tracking system 10 may be connected to an audio/visual device 16 having a display 14. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The audio/visual device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

FIG. 1 illustrates an example embodiment with users 18a and 18b participating in a game of soccer. In this example, a computing environment 12 may use the audiovisual display 14 to provide a visual representation of two avatars 19a and 19b in the form of soccer players controlled by the respective users 18a and 18b. In embodiments, an avatar 19 mimics the movements of a corresponding user 18 in real world space so that the user 18 may perform movements and gestures which control the movements and actions of the avatar 19 on the display 14. A user 18 may move or perform a kicking motion in physical space to cause his associated player avatar 19 to move or kick the soccer ball in game space.

FIG. 1 illustrates an example of using different camera units within capture devices 20a and/or 20b to obtain a wider field of view in a natural user interface (NUI) system in which a user's movements control a software application such as a game or other multimedia application. Multiple capture devices can be used to increase the size of the play space or scene. As user herein, a scene is the aggregate area captured by image sensors of the capture devices 20. A play space is a scene captured by capture devices 20 in the context of a gaming application running on computing environment 12. Additionally, multiple capture devices can help offset issues of inadequate resolution or illumination of a scene, or occlusion of objects within the scene. As explained below, the data from multiple capture devices viewing a common scene is synthesized or stitched together to reconcile the data from the multiple sources.

The computing environment may receive information from a plurality of sources, which in embodiments may be, or include, the plurality of capture devices 20a and/or 20b. There may be more than two capture devices 20 in further embodiments. The capture devices 20 include image sensors within them. Preferably, the image sensors within the capture devices 20 are homogeneous for purposes of calibration and synchronization. In other embodiments, they may be different and calibration compensates for their differences.

As shown in FIG. 1, the capture devices 20 are generally trained on a single area. Each capture device 20 may be set up at an arbitrary position and orientation, and with a focal length, to capture at least a portion of a scene, with overlap occurring at one or more boundary regions. In the example of FIG. 1, the pair of capture devices 20 are fixed to a fixture 23 so that the spacing and orientation of the associated capture devices is generally known. This known positioning reduces the calibration requirement. Embodiments for calibrating the position of two or more capture devices to each other and to a scene, where the initial positions are not known, is disclosed in U.S. application Ser. No. 12/792,961, entitled "Synthesis of Information From Multiple Audiovisual Sources", filed Jun. 3, 2010, which application is incorporated by reference herein in its entirety.

The camera units are calibrated to each other and to the scene. As a scene may often have users and objects moving into and out of the scene, data from the multiple capture devices are time synchronized to ensure that data from the visual sources are providing data of the scene at the same time.

As indicated above, capture devices 20a, 20b may be the same or different in embodiments of the present technology. One example of a capture device 20 which may be used as any or all of the devices 20 shown will now be described with reference to FIG. 2. In this illustrative example, the capture devices 20a and 20b are the same type and both are shown connected to a computing environment 12 which processes image data from both cameras. As they are both of the same type, the discussion below with respect to capture device 20 and its components, e.g. 28, 36, are meant to describe the components in each of the capture devices.

In an example embodiment, the capture device 20 may be configured to capture video having a depth image that may include depth values via any suitable technique including, for example, time-of-flight, structured light, stereoscopy or the like. According to one embodiment, the capture devices may organize the calculated depth information into "Z layers", or layers that may be perpendicular to a Z axis extending from the depth camera along its line of sight. In further embodiments, the capture devices may organize the calculated depth information into vectors extending at different angles from the depth camera to a captured data point.

Figure 2:
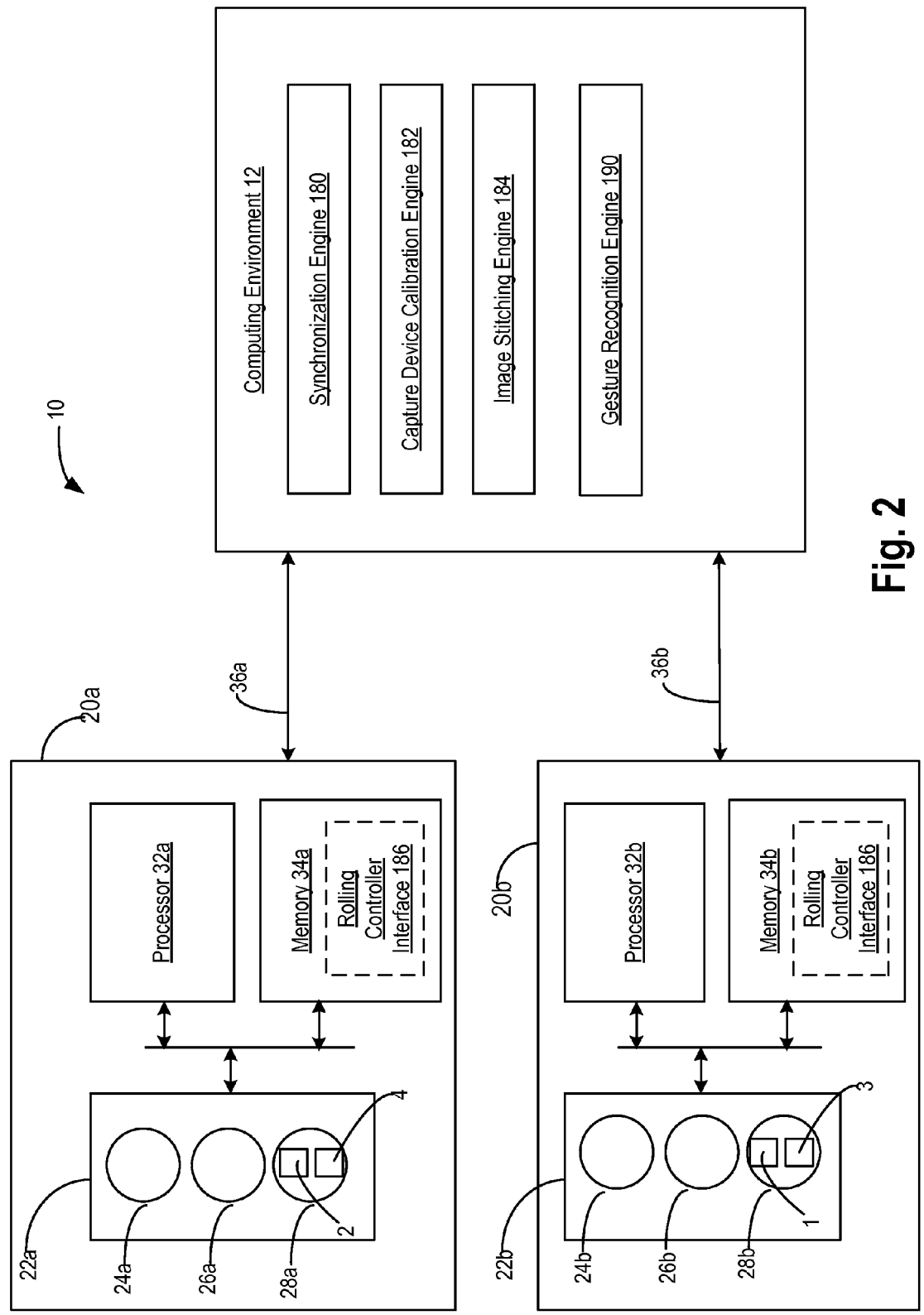
FIG. 2 illustrates an example embodiment of a capture device that may be used in a target recognition, analysis, and tracking system.

As shown in FIG. 2, each capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, the IR light component 24 of the capture device 20 may emit an infrared light in a time of flight analysis or a structured light onto the scene and may then use sensors (not shown) to detect the backscattered light from the surface of one or more targets and objects in the scene using, for example, the 3-D camera 26 and/or the RGB camera 28.

According to another embodiment, each capture device 20 may include two or more physically separated cameras that may view a scene from different angles, to obtain visual stereo data that may be resolved to generate depth information. In a further example embodiment, the capture device 20 may use point cloud data and target digitization techniques to detect features of a scene and/or user.

Each of the cameras can include one or more image sensors. For example, the RGB camera can include a plurality of RGB CMOS sensors. In this example, RGB camera 28a includes two image sensors 2 and 4 positioned so that the FOV segment of sensor 2 will be on top of the FOV segment of sensor 4, and they will share an overlap area of rows of the bottom of the FOV segment captured by sensor 2 and rows of the top of the FOV segment captured by sensor 4. Similarly, RGB camera 28a includes two image sensors 1 and 3 positioned in this example so that the FOV segment of sensor 1 will be on top of the FOV segment of sensor 3, and they will share an overlap area of rows of the bottom of the FOV segment captured by sensor 1 and rows of the top of the FOV segment captured by sensor 3. Additionally, as will be shown in the example of FIG. 4, image capture devices 20b and 20a including the four sensors are positioned so that sensors 1 and 2 are positioned to have adjacent FOV segments which are side by side and share an overlap area of columns on their vertical edges. Similarly, sensors 3 and 4 are positioned to have adjacent FOV segments which are side by side and share an overlap area of columns on their vertical edges. This is just one exemplar arrangement.

In one embodiment, as mentioned above, a typical CMOS interline image sensor is used which includes control circuitry which causes one line at a time of pixels to readout image data in a direction during an image frame. For a frame rate of 30 frames per second, the entire array is traversed in about 25 to 30 milliseconds (ms). As previously mentioned, in other embodiments, an external shutter can be used with the CMOS sensor if desired, which shutter can control exposure of each line of pixels for capture of image data while blocking the other lines. The direction of traversal is often preset for a CMOS sensor in its control circuitry. To change direction for a camera, the sensor position can be changed in an arrangement. In another embodiment, the direction of traversal, such as up, down, left, right can be programmed as discussed below.

In an example embodiment, each capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

Each capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22. In the embodiment of FIG. 2, an optional rolling controller interface software module 186 is stored in the memory 34 of each capture device 20a, 20b. Under the control of the rolling controller interface 186, the processor 32 can receive instructions from software such as the image stitching engine 184 (see below) on a direction of traversal or roll for each image sensor, and send a message with the direction to control circuitry indicating the direction.

As shown in FIG. 2, each capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a master clock to the capture devices 20 that may be used to determine when to capture a scene via the communication link 36 as explained below with respect to the synchronization engine 184.

FIG. 2 shows several components of computing environment 12 which may be used to calibrate relative positions of capture devices 20, and to synchronize the audio and/or visual data obtained from the devices. Such components include a synchronization engine 180, capture device calibration engine 182 and image stitching engine 184. These engines may be implemented in software, hardware or a combination of software and hardware.

Additionally, each capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Other techniques include transforming the image into a body model representation of the person and transforming the image into a mesh model representation of the person.

The skeletal model may then be provided to the computing environment 12 such that the computing environment may perform a variety of actions. The computing environment may further determine which controls to perform in an application executing on the computer environment based on, for example, gestures of the user that have been recognized from the skeletal model. For example, as shown, in FIG. 2, the computing environment 12 may include a gesture recognition engine 190 for determining when the user has performed a predefined gesture as is known in the art.

As explained below, embodiments of the present technology use both depth camera data and RGB camera data when calibrating the different capture devices 20 to each other. Accordingly, in such embodiments, a depth camera 26 and RGB camera 28 of a given capture device 20 are synchronized both with respect to each other and with respect to the depth cameras 26 and RGB cameras 28 of other capture devices 20. Thus, all cameras 26 and 28 and their image sensors in all capture devices 20 may be synchronized together by the synchronization engine 180.

In embodiments, the capture devices 20 including their image sensors may be placed at positions around a scene to be captured, where the spacing and orientation between capture devices is unknown. In a first aspect of the present technology, the capture devices 20 are calibrated with respect to each other and the scene they are capturing by the synchronization engine 180 and capture device calibration engine 182. The operation of engines 180 and 182 for calibration of the field of view of the capture devices 20a, 20b is now explained with reference to the high level flowchart of FIG. 3.

Figure 3:
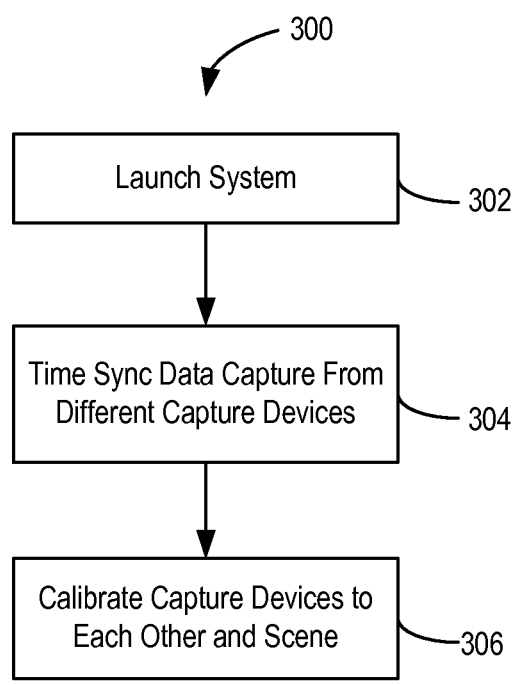
FIG. 3 is high level flowchart of a process for initializing capture devices to each other and a scene.

FIG. 3 is high level flowchart of a method embodiment 300 for initializing capture devices to each other and a scene. In step 302, the system 10 is launched. At that point, capture devices 20 begin capturing data of a scene and transmitting it to the computing environment 12. The scene captured by the capture devices 20 may not be static. Users and objects may be entering and leaving the scene. In one example, the calibration engine 182 may have a calibration routine which walks a user through the calibration process. In such embodiments, the calibration routine may tell the user to stay still and/or to move only at certain times and in defined ways, while the capture devices 20 are calibrated.

Within each capture device 20, frames of scene information are captured by the depth camera and RGB camera. The captured data is used by the synchronization engine 180 to time synchronize 304 data capture from the different capture devices. The control circuitry of the image sensors #1, #2, #3 and #4 receive via the processor 32 an indication of when a frame starts from the synchronization engine 180. The control circuitry provides a clock for each of its sets of pixel elements to time stamp their data capture to be identified within the frame period. As will be described later, the synchronization engine 180 can use these time stamps in stitching overlap areas of the different FOV segments captured by the image sensors.

In order to calibrate the different capture devices 20, the synchronization engine identifies by the time stamps the image data in the FOV segments buffers which were captured during the same frame time period. Again, the data of the individual rows or columns will have different time stamps due to the scanning technique, for example a rolling shutter or rolling capture technique, but image data from a field of view segment should fall in the same frame period. This way, the calibration engine 182 can perform its analysis on the image data from the different image sensors of the devices 20 captured within the same frame time period.

The synchronization engine 180 looks at the frame data received from all devices for a given frame number. Using the time stamps for such data for a given frame, as well as the known resolution for each of the cameras, the synchronization engine determines the required time offsets for the depth and RGB data from each device generating the data. From this, the synchronization engine may determine a required adjustment in the timing of each depth and RGB device across all capture devices. The synchronization engine may select as a reference a time stamp from a single device's frame data (e.g., the device that generated the first data for that frame) and set that time stamp as the reference time stamp. The frame data for all other devices may then be adjusted to that reference time stamp. Alternatively, the synchronization engine may generate an internal clock reference, and set the adjustment for all frame data to that internal clock reference.

Returning now to FIG. 3, once image data frames are synchronized for a moving scene of data in step 304, the capture devices may be calibrated to each other and the scene in step 306.

In embodiments, the calibration operation is performed by calibration engine 182 using both the depth information and RGB information from the different capture devices. Depth cameras provide information about an x, y and z position of points in an image, but may have low resolution. RGB cameras do not provide depth information in the z direction, but typically have high resolution and texture for discerning discontinuities, or cues, used to correlate one capture device's view to another. Accordingly, embodiments of the present technology may use both depth and RGB cameras from a capture device for the calibration process.

However, as noted above, while more computationally intensive and depending on objects in the scene, it may be possible to calibrate the capture devices to each other and a scene using only depth information from two or more of the capture devices. Similarly, though more computationally intensive still and depending on the objects in the scene, it may be possible to calibrate devices to each other using only RGB information from two or more capture devices. Technology for calibrating camera views using RGB information alone is described for example in U.S. Patent Publication No. 2007/0110338, entitled "Navigating Images Using Image Based Geometric Alignment and Object Based Controls", published May 17, 2007, which publication is used in the technology of Photosynth™ image recognition software from Microsoft Corporation, and which publication is incorporated herein by reference in its entirety. Additional information on calibrating cameras can be found in U.S. patent application Ser. No. 12/792,961 entitled "Synthesis of Information from Multiple Audiovisual Sources", filed on Jun. 3, 2010. That application, together with the patents and publications cited therein, are incorporated by reference herein in their entirety. The capture devices 20a and 20b are arranged as in FIG. 1 with their lens pointing toward the center of the desired scene. This coarse adjustment is so that the FOV segments of the image sensors will be adjacent. Well-known calibration techniques can be used for the cameras 20a and 20b to fine tune the alignment of the FOV segments for adjacency.

As explained in the Background section, any movement of an object in an area of overlap between two FOV segments captured using a scanning technique like a rolling capture technique created motion artifacts, the correction of which added more time or latency to the time for stitching images together for a composite scene and rendering the scene image. This is because, using rolling capture, the moving object in the area of overlap was captured at the beginning of a frame by the first image sensor and at the end of the frame by the second image sensor. Depending on the rate at which the object was moving, the object may appear at two distinct spatial locations in the overlap area. An object appearing at two distinct spatial locations in the overlap area is an example of a motion artifact.

This problem is addressed by the present technology in general by using opposite directions of traversal of sets of light sensitive elements between two adjacent FOV segments. The result is that sets of light sensitive elements in the first image sensor and second image sensor will capture an object in an overlap area during a same overlap time period (either at the beginning of the frame or at the end of the frame). This simplifies the stitching together of a composite scene of the two FOV segments.

Figure 4:
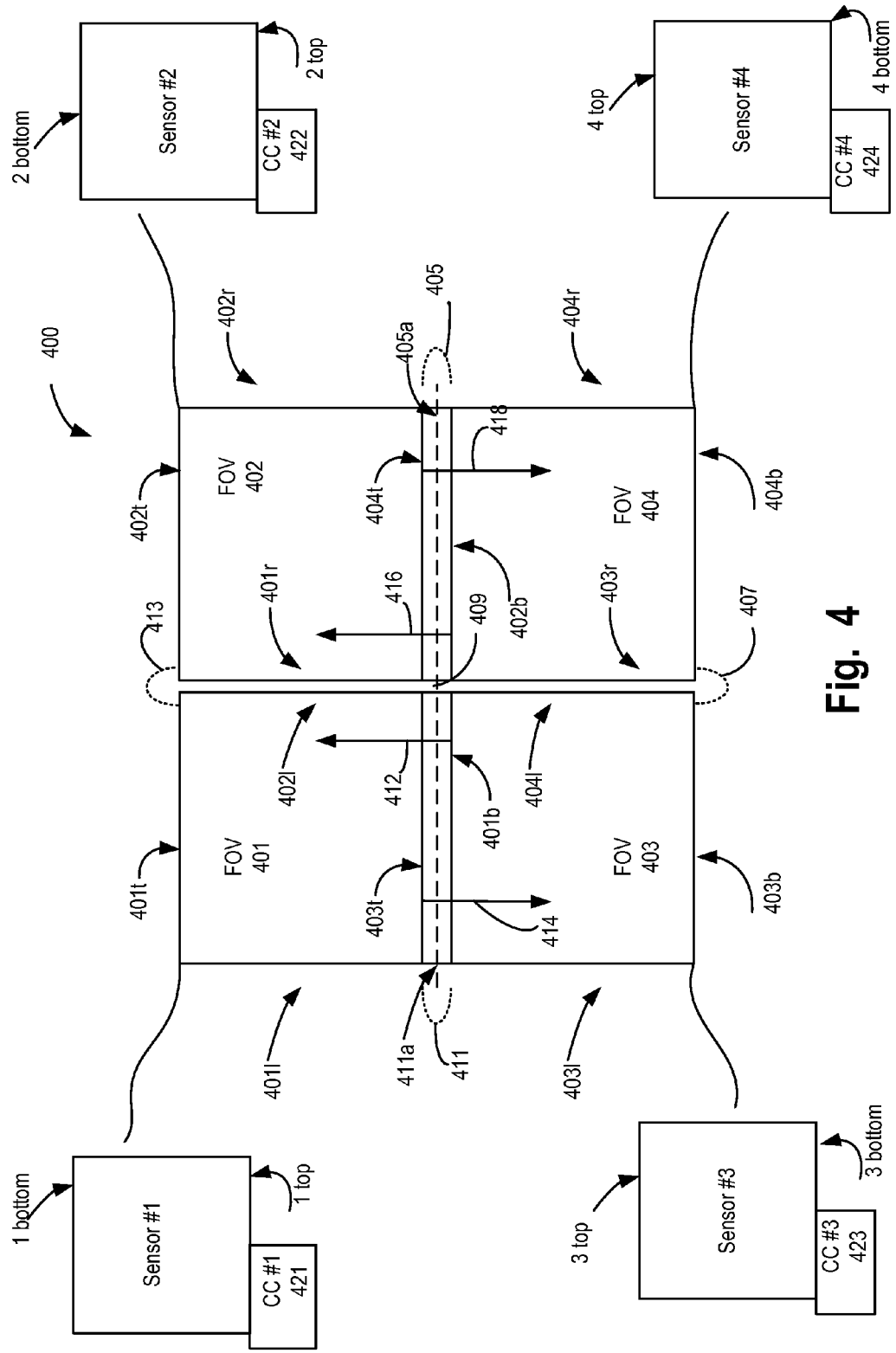
FIG. 4 schematically illustrates an example of an arrangement of overlapping FOV segments captured by images sensors in one or more capture devices.

FIG. 4 schematically illustrates an example of an arrangement 400 of overlapping FOV segments captured by images sensors in one or more capture devices 20. In the example shown, there is an image sensor array 400 formed of four image sensors #1, #2, #3 and #4 arranged to capture four FOV segments 401, 402, 403 and 404. Each sensor is shown with its respective control circuitry as follows: CC#1, 421, for sensor #1, CC#2, 422, for sensor #2, CC#3, 423, for sensor #3, and CC#4, 424, for sensor #4. In this embodiment, each of the sensors is preset to start its traversal or roll of its sets of light sensitive elements at the set which is designated the top of the sensor which is indicated by 1 top, 2 top, 3 top and 4 top. In this example, the sets of light sensitive elements are lines of pixels on a CMOS sensor. In order to have opposite directions of traversal, sensor #1 may be physically flipped so that its "top" line, as indicated by 1 top is now on the bottom vertically and its bottom line designated as 1 bottom is vertically on top. Sensor #3 has a normal orientation with its top line 3 vertically above its bottom line of pixels 3 bottom. Image sensor #2 has a similar flipped physical arrangement with respect to sensor #4 which has a normal orientation like sensor #3. A line in this embodiment is a horizontal row. In other embodiments, the sensors can be arranged for traversing lines in vertical columns. Additionally, in other embodiments, the direction of traversal can be programmed and therefore changed without physically rearranging the sensors.

It is understood that reversing the direction of scanning may be accomplished by means other than flipping of image sensors. For example, the image sensors #1 and #3 may be kept in the same orientation (i.e., not flipped with respect to each other), but the time at which lines of light sensitive elements are exposed may be reversed in one of the sensors #1 and #3. Other means of reversing the direction of scan for one of two image sensors capturing adjacent FOV segments are contemplated.

Using homogeneous image sensors can improve results. Homogeneous images sensors can be the same type of image sensors or image sensors with similar operating characteristics. Storage rates for pixels, different light sensitivities of pixels, different focal widths of pixels and different array sizes are examples of operating characteristics.

It is understood that the array 400 may be arranged in a wide variety of other configurations, including greater or fewer image sensors, where at least two image sensors have FOV segments adjacent to each other with a shared overlap region which is traversed in opposite directions.

Sensor #1 captures the part of the scene which falls into FOV segment 401 which segment is bounded as indicated by 401t for its top, by 401b for its bottom, by 401l for its left and by 401r for its right. Arrow 412 indicates its direction of traversal of its pixel rows from the bottom 401b of its segment which corresponds to 1 top towards the top of the segment 401t which corresponds to 1 bottom. The sensor #1 may be upside down, but the FOV segment is not. Sensor #1 shares overlap area 411 with the FOV 403 of Sensor #3. The boundaries of the FOV segment 403 are indicated by 403t for its top, by 403b for its bottom, by 403l for its left and by 403r for its right. Vertically adjacent FOV segments 401 and 403 share the same width. Overlap area 411 has the top 403t of FOV segment 403 at its top and the bottom 401b of FOV segment 401 as its bottom. Arrow 414 indicates the direction of traversal for FOV segment 403 by sensor #3, 3 top to 3 bottom, of its pixel rows from the top 403t of its segment towards the bottom of the segment 403b.

FOV segment 401 also shares an overlap area 413 at its boundary with adjacent FOV segment 402 of sensor #2. The boundaries of the FOV segment 402 are indicated by 402t for its top, by 402b for its bottom, by 402l for its left and by 402r for its right. Horizontally adjacent FOV segments 401 and 402 share the same height. Overlap area 413 is bounded by the left side 402l of FOV segment 402 and is bounded on its right by the right side 401r of FOV segment 401. Overlap areas 413 and 411 themselves overlap in the overlap intersection area 409 at which all overlap areas in this 2×2 array example intersect with their overlapping. The direction of traversal as indicated by arrow 416 for FOV segment 402 is the same as it is for FOV segment 401. The columns of lines in overlap area 413 have the closest spatial and temporal relationship as they are capturing the same scene area at the same time as long as sensor #1 and sensor #2 are synchronized in their rolling capture.

For the side by side segments of 401 and 402, and of 403 and 404, the start of scanning, rolling capture in this embodiment, may be synchronized to occur at the same time. For the FOV segments sharing an overlap area captured by opposite directions of traversal, implemented in this embodiment by flipped sensors, there can be a time offset between start of rolling capture which can be compensated for as long as the offset is known. Using the offset, one can find the different line in each sensor where the overlap area begins.

FOV segment 404 also shares an overlap area 405 at its boundary with adjacent FOV segment 402, and an overlap area 407 at its boundary with adjacent FOV segment 403. The boundaries of the FOV segment 404 are indicated by 404t for its top, by 404b for its bottom, by 404l for its left and by 404r for its right. Horizontally adjacent FOV segments 403 and 404 share the same height, and vertically adjacent FOV segments 402 and 404 share the same width. Arrow 418 indicates direction of traversal of its pixel rows of FOV segment 404 from the top 404t of its segment towards the bottom of the segment 404b. This direction of traversal is opposite that of arrow 412 for FOV segment 402 and the same as that for arrow 414 of FOV segment 403.

Overlap area 407 is bounded by the left side 404l of FOV segment 404 and is bounded on its right by the right side 403r of FOV segment 403. Overlap area 407 has the same characteristics as overlap area 413 in that it provides the closest spatial and temporal relationship in the content captured with FOV segment 403, but only for a few columns of data. Overlap area 405 has the top 404t of FOV segment 404 at its top and the bottom 402b of FOV segment 402 as its bottom. Overlap areas 405 and 407 overlap themselves and areas 413 and 411 in the overlap intersection area 409.

Depending on the implementation, the degree of overlap can have some dependency on the distance of the objects from the lens. The smaller the overlap, the better for keeping closer spatial and temporal relationships between adjacent FOV segments. Lines 411a and 405a are illustrative of crossover zones in the overlap areas 411 and 405 traversed in opposite directions. The crossover zone is the area of the overlap area having the closest spatial and temporal relationship. That is, at some time, t, into the rolling capture, the respective image sensors each have a zone of pixel elements that sense the same area from the scene within the closest time frame in the overlap time period. Each of the dashed lines 411a and 405a may represent a plurality of lines or it can be a single line sharing the same time of capture and space.

The zone 405a, 411a of shared time and space may be in the middle of the overlap area 405, 411, but it need not be in further embodiments. A crossover zone can be identified during calibration of the FOV segments or in real time without calibration by identifying the two closest adjacent lines in terms of spatial content and time capture.

In the above example, the rolling capture is vertical, along horizontal rows of lines of pixel elements. In other examples, the rolling capture can be horizontal, along vertical rows of pixel elements. Additionally, in the example of FIG. 4, the rolling capture sequence begins at the overlap area shared with the adjacent field of view. Traversing the overlap area at the beginning of a captured frame provides the advantage of more processing time to perform stitching of the segments before the rest of the frame is read out, thus, reducing overall latency. In another example, the sequence begins at the non-overlapping edge of the FOV segment for each sensor and proceeds towards the rows of pixel elements in the overlap areas 411 and 405. In the second example, the overlap area is reached near the end of the frame scan, but in both examples, the rolling captures have the same overlap time period.

Figure 5:
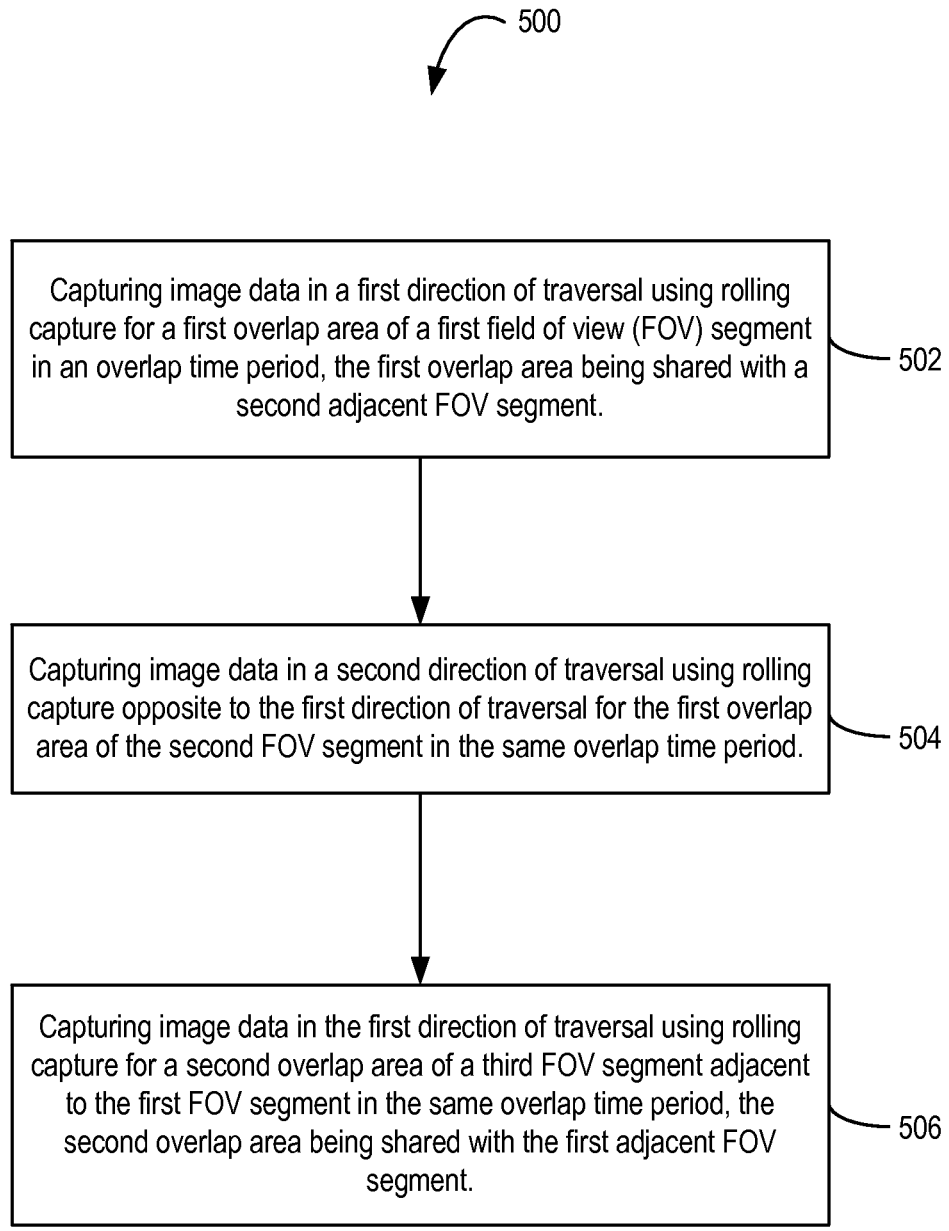
FIG. 5 illustrates a method embodiment for image processing in an overlap area captured using a rolling capture technique.

FIG. 5 illustrates a method embodiment 500 for image processing in an overlap area captured using a rolling capture technique. This method can be used in a system including image sensors using rolling capture. FIG. 5 is discussed in the context of FIG. 4 for illustrative purposes only and not to be limiting thereof.

A sensor, such as any of the four sensors in FIG. 4, captures 502 image data in a first direction of traversal using rolling capture for a first overlap area of a first field of view (FOV) segment in an overlap time period. The first overlap area is shared with a second adjacent FOV segment. For ease of description, reference will be made to FOV segment 401 as the first FOV segment, and to FOV segment 403 as the second adjacent FOV segment. FOV segments 402 and 404 could have been used as well.

Sensor #3 captures 504 image data in a second direction of traversal using rolling capture opposite to the first direction of traversal for the first overlap area of the second FOV segment, e.g. FOV segment 403 in the same overlap time period.

Reference is now made to FOV segments 401 and 402 for illustrative purposes only. Sensor #2 captures 506 image data in the first direction of traversal, that used by FOV segment 401, using rolling capture for a second overlap area of a third FOV segment, e.g. 402, adjacent to the first FOV segment, e.g. 401, in the same overlap time period, the second overlap area being shared with the first adjacent FOV segment, e.g. 401.

Similarly, Sensor #3 and Sensor #4 capture image data in the same direction of traversal using rolling capture for a third overlap area 407 in the same overlap time period in which the overlap areas between the other FOV segments is captured.

Besides CMOS image sensors, the technology can operate in other image sensing systems using a scanning technique. As previously mentioned, some examples of such systems include image sensors which are raster scanned as in analog CRT systems, laser scanners or other systems where a beam activates a light sensitive area in a sequential manner. Using an arrangement of raster scanned digital sensors such as in FIG. 4, a respective beam of light traversing each of the respective sets of light sensitive elements of each of the first, second, third and fourth image sensors in a scanning pattern; and the scanning pattern for each respective beam starts in the middle of the overlap intersection area 409 and scans the rows in the respective predetermined direction of traversal.

Figure 6:
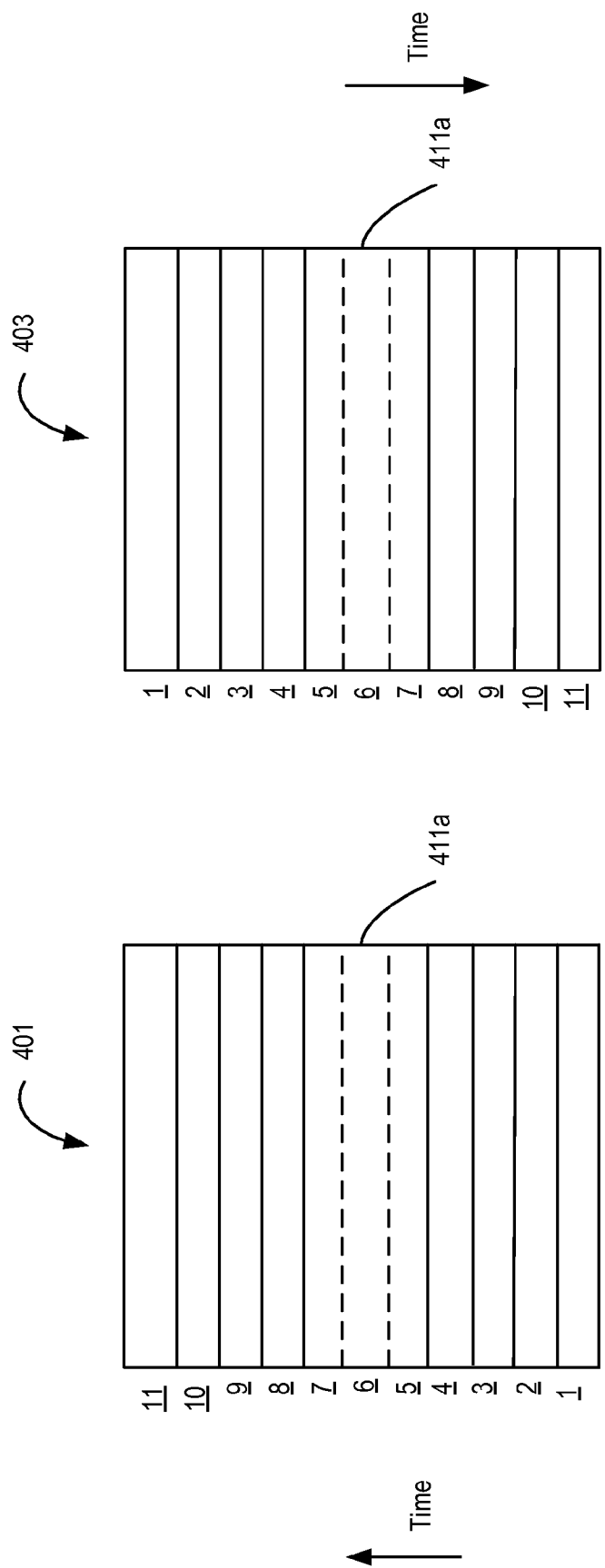
FIG. 6 illustrates an example of an overlap area represented in separated vertically adjacent FOV segments.

FIG. 6 illustrates the overlap area in the FOV segment 401 separated from the overlap area of the vertically adjacent FOV segment 403. In this simplified example, the overlap area of the FOV segments 401 and 403 comprises 11 pixel lines of data from 11 rows of pixel elements. An overlap area may be more or less lines of pixel elements than this in further embodiments. As indicated by the side arrows labeled "Time", using the sequence of rolling capture from the example of FIG. 4 sensor #1 captures image data sequentially from line 1 to line 11 for the FOV segment 401, and sensor #3 captures image data sequentially from line 1 to line 11 in the opposite direction the FOV segment 403. As successive lines of pixels capture data, the two image sensors approach the crossover zone 411a of closest time and space.

Ultimately, pixel line 6, represented in dashed lines, can represent image data of the same space at the same time to a degree of precision depending on the homogeneity of the image sensors and the precision of the alignment of their field of view segments. At line 6, the image data in common from the two image sensors #1 and #3 will be most closely aligned, ideally only offset by the parallax resulting from the two image sensors being at different locations. After line 6, the image data for pixel lines 7 through 11 in each FOV segment moves away from each other in time and space respectively. For example, pixel line 11 of FOV segment 401 captures the same space as pixel line 1 of FOV segment 403, but the capture time stamps for these two pixel lines are the farthest apart for the overlap area. Pixel line 3 of FOV segment 401 captures the same space as pixel line 9 of FOV segment 403, and the capture time stamps for these two lines are closer than for pixel lines 1 and 10. If the data is followed from the crossover zone towards the non-overlapping area of FOV segment 401, data selected in the overlap area 411 for stitching or error correction will predominantly come from that for the FOV segment 401. Similarly, if the data is followed from the crossover zone towards the non-overlapping area of FOV segment 403, data selected in the overlap area 411 for stitching or error correction will predominantly come from that for the FOV segment 403.

Additionally, as noted for FIG. 4, the overlap areas 413 and 407 between adjacent FOV segments captured in the same direction of traversal provide data captured in the same space and time.

As shown above, the technology provides better spatial and temporal relationships between the lines in the overlap area, and as a result, there are fewer motion artifacts such as discontinuities. Furthermore, some motion artifacts which may arise are within a blurriness level for defocus and motion blur which is typical for a resolution for a particular frame rate such as the 30 frames per second example, so image error correction techniques need not be applied. These spatial and temporal relationships also improve results for blending in the overlap boundaries and when a discontinuity does arise, and an image error correction technique is used.

An example of an error correction technique, particularly useful for lost or occluded data is to replace data in the overlap area with data for the same overlap area from an adjacent FOV segment. For example, if sensor #1 failed to capture data for the corner of the FOV segment 401 falling within the overlap intersection area 409, data from either the overlap area 413 with FOV segment 402 or the overlap area 411 with FOV segment 403 could be used. As the data in overlap area 413 falling within overlap intersection area 409 would have captured the same space in the scene at the same time by Sensor #2, the data from this overlap area 413 would be selected. For example, a weighting factor based on time and space relationship would give the highest rating to the data of overlap area 413 falling in the overlap intersection area 409, and this data is used for the final image frame.

Figure 7:
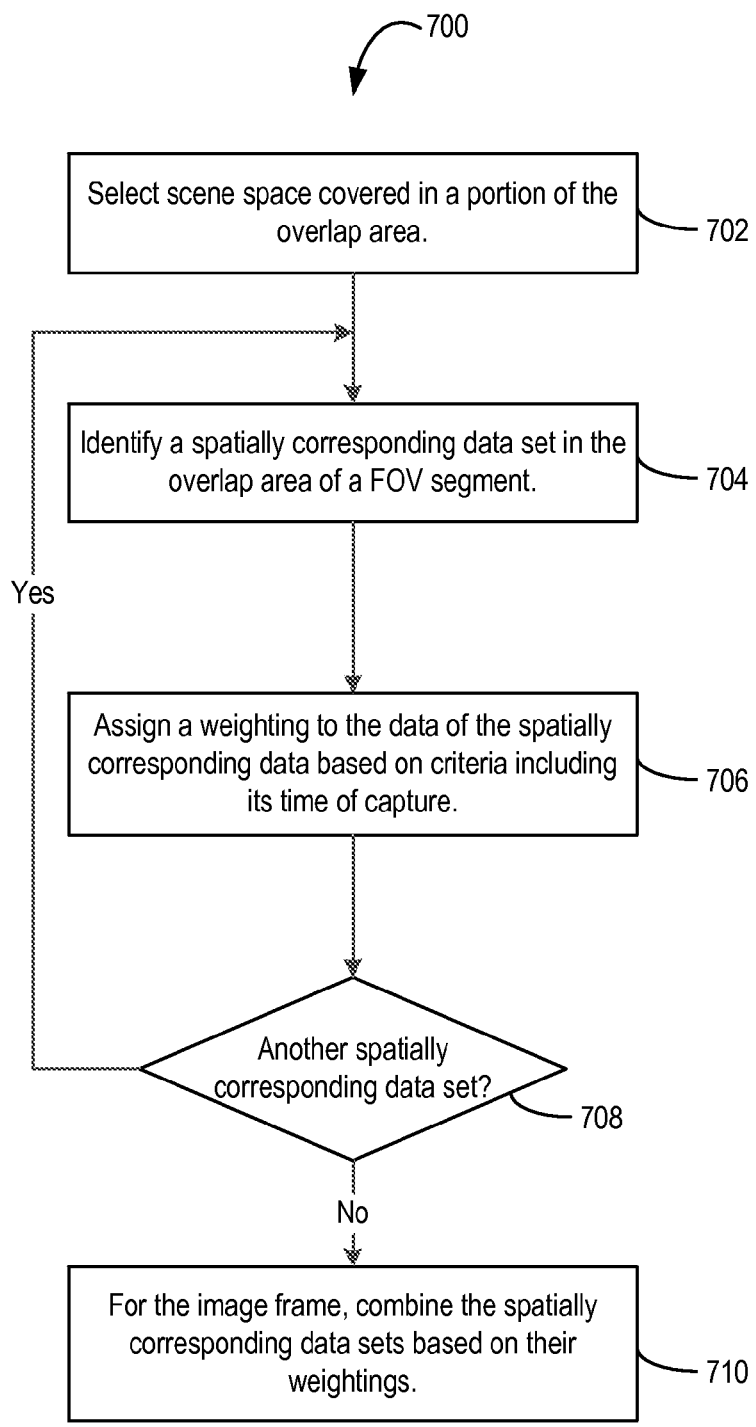
FIG. 7 illustrates a method embodiment of stitching image data in an overlap area between adjacent FOV segments.

Taking advantage of these characteristics, FIG. 7 illustrates a method embodiment of stitching image data in an overlap area between adjacent FOV segments. For each FOV segment, the image stitching engine 184 selects 702 a scene space covered in a portion of the overlap area, and identifies 704 a spatially corresponding data set in the overlap area of an adjacent FOV segment. For example, lines 3 and 9 in the segments 401 and 403 are spatially corresponding as the data for these lines was captured by lines of the respective image sensors 1 and 3 focused on the same space in the scene (though at different times). In another example, a column of pixel data in overlap area 407 between FOV segments 403 and 404, which were traversed in the same direction, are spatially corresponding, and temporally corresponding, as they were captured at the same time by image sensor 3 and 4 while focused on the same space in the scene.

The stitching engine 184 assigns 706 a weighting to the spatially corresponding data set based on criteria including how current the time of capture. As noted above, time difference in capture of the same scene space can introduce discontinuities and other artifacts due to motion or change of environmental conditions in the scene. A larger time difference receives less of a weighting while a smaller time difference receives a greater weighting. Other factors can also be included in the weighting such as blurriness, failure to capture content by a light sensitive element, discontinuity between a pixel and a neighbor pixel, or maybe an occlusion on one of the sensors. For the column example, when stitching the vertical boundary between sensors 3 and 4, most of the column data in 407 will have the same time and space, so other factors will play a more prominent role in the weighting. However, when stitching the data from sensors 1, 3, and 4 in the area of intersection 409, there may be enough discontinuity between the data of 407 falling within 409 and the data in overlap areas of 405 and 411 falling with 409, that the contribution from 407 and perhaps 413 is ignored, and only 411 and 405 are used for stitching the vertical fields of view together.

The stitching engine 184 checks 708 for any additional spatially corresponding data sets. Responsive to there being another, this other is assigned 706 a weighting. Responsive to there not being another, the stitching engine 184 combines 710 the spatially corresponding data sets in the adjacent FOV segments based on their weightings. For example, the stitching engine 184 can produce a weighted sum of two pixel lines from the FOV segments 401 and 403 to be used in the image frame.

Image processing techniques for error correction or image clean-up techniques can also take advantage of the closer temporal and spatial relationships afforded by the sequencing of rolling capture or scanning as discussed above. For example, pixel line data corrupted or missing in the overlap area of one FOV segment can be replaced by the spatially corresponding pixel lines in the adjacent FOV segment as discussed above.

Where a view from a first capture device transitions to the view of another capture device, various known blending and smoothing techniques may be employed, for example alpha blending, to provide a smooth and seamless transition. See U.S. Patent Publication No. 2007/0110338, hereby incorporated by reference. Moreover, it may happen that there are gaps within a scene which are not captured by any of the capture devices. Techniques are known for filling in these gaps, using depth and image data from the images bordering the gaps. Such techniques are also disclosed in U.S. Patent Publication No. 2007/0110338, previously incorporated by reference.

Figure 8A:
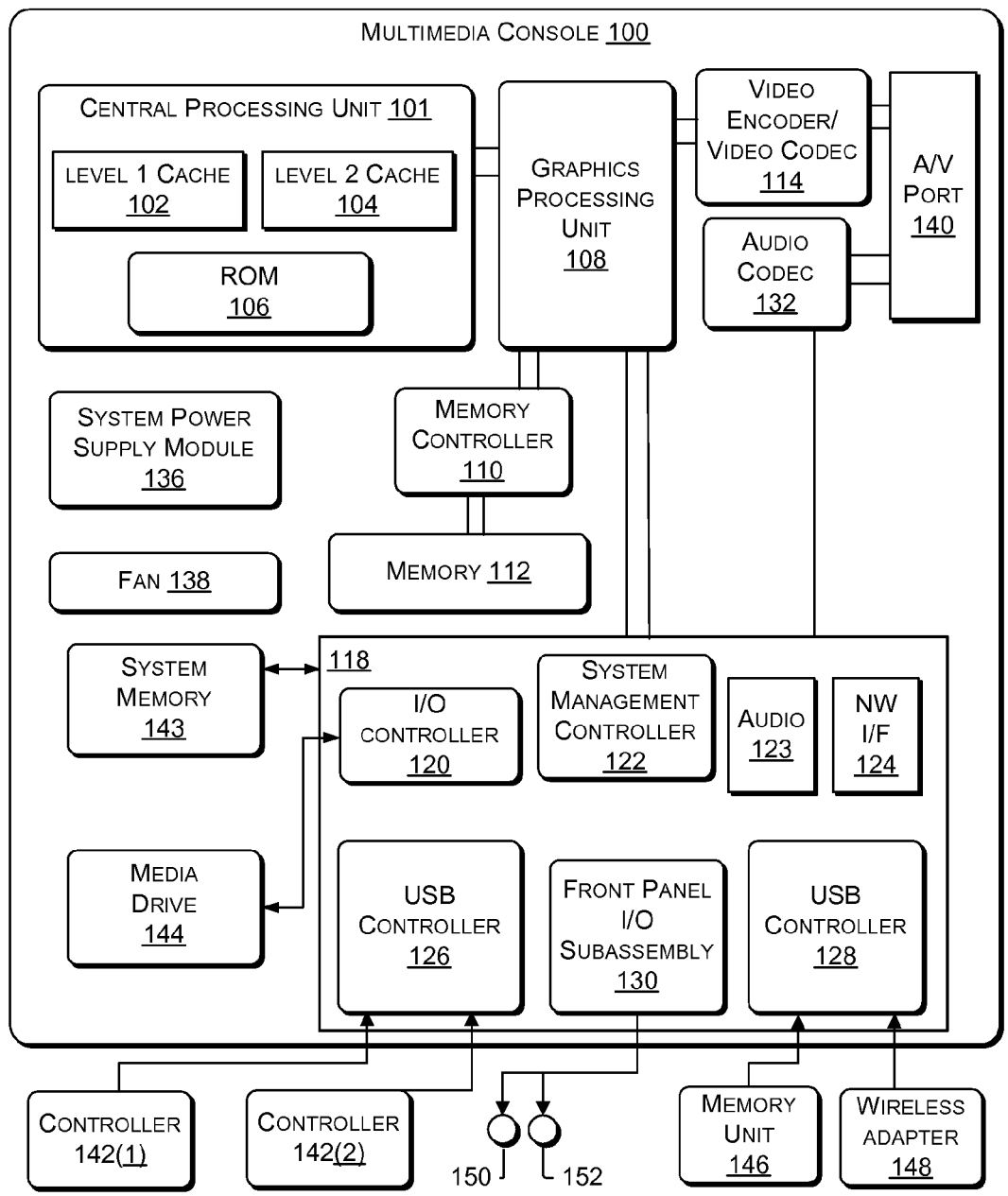
FIG. 8A illustrates an example embodiment of a computing environment that may be used to interpret one or more gestures in a target recognition, analysis, and tracking system.

FIG. 8A illustrates an example embodiment of a computing environment that may be used in a target recognition, analysis, and tracking system like that shown in FIGS. 1 and 2. The computing environment such as the computing environment 12 described above with respect to FIGS. 1-2 may be a multimedia console 100, such as a gaming console. As shown in FIG. 8A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 8B:
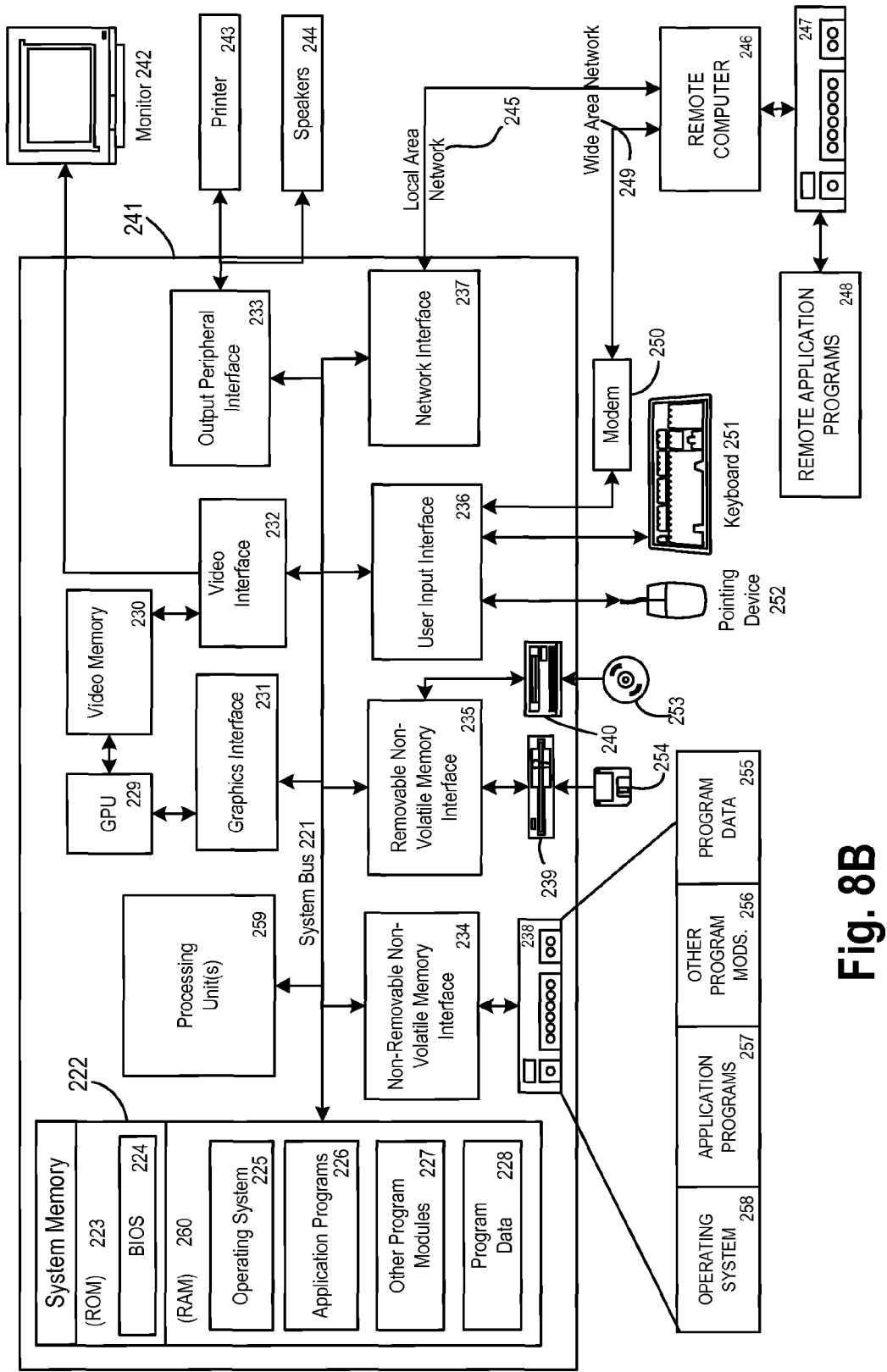
FIG. 8B illustrates another example embodiment of a computing environment that may be used to interpret one or more gestures in a target recognition, analysis, and tracking system.

FIG. 8B illustrates another example embodiment of a computing environment 220 that may be the computing environment 12 shown in FIGS. 1-2 used in a target recognition, analysis, and tracking system 10. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s).

In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 8B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 14B illustrates operating system 225, application programs 226, other program modules 227, and program data 228. FIG. 14B further includes a graphics processor unit (GPU) 229 having an associated video memory 230 for high speed and high resolution graphics processing and storage. The GPU 229 may be connected to the system bus 221 through a graphics interface 231.

The computer 241 may also include other removable/non-removable, volatile/nonvolatile computer storage media. By way of example only, FIG. 14B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 14B, provide storage of computer readable instructions, data structures, program modules and other data for the computer 241. In FIG. 14B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 14B. The logical connections depicted in FIG. 14B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 14B illustrates remote application programs 248 as residing on memory device 247. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In a system of image sensors using a scanning technique to capture image data, a method of image processing image data in an overlap area comprising:
    capturing image data in a first direction of traversal for a first overlap area of a first field of view (FOV) segment in an overlap time period, the first overlap area being shared with a second adjacent FOV segment; and
    capturing image data in a second direction of traversal opposite to the first direction of traversal for the first overlap area of the second FOV segment in the same overlap time period.

2. The method of claim 1, wherein:
    the capturing image data in a first direction of traversal further comprises starting the traversal at an edge of the first FOV segment in the shared overlap area; and
    the capturing image data in a second direction of traversal further comprises starting the traversal at an edge of the second FOV segment in the shared overlap area.

3. The method of claim 1, wherein:
    the capturing image data in a first direction of traversal further comprises starting the traversal at a non-overlapping edge of the first FOV segment and ending in the shared overlap area; and wherein
    the capturing image data in a second direction of traversal further comprises starting the traversal at non-overlapping edge of the second FOV segment and ending in the shared overlap area.

4. The method of claim 1 further comprising:
    capturing image data in the first direction of traversal for a second overlap area of a third FOV segment adjacent to the first FOV segment in the same overlap time period, the second overlap area being shared with the first adjacent FOV segment.

5. The method of claim 1 further comprising combining data of both FOV segments in the overlap area for an image frame of data.

6. The method of claim 1, wherein:
    combining data of both FOV segments in the overlap area for an image frame of data further comprises
    for a selected scene space covered in a portion of the overlap area, identifying
    one or more spatially corresponding data sets in the adjacent FOV segments covering the overlap area;
        assigning a weighting to the spatially corresponding data sets based on criteria including how current the time of capture; and
        combining the spatially corresponding data sets in the adjacent FOV segments based on their weightings.

7. A system of image sensors comprising:
    a plurality of image sensors including a first image sensor and a second image sensor;
    each of the first and second image sensors covering adjacent field of view (FOV) segments and sharing a first overlap area in their adjacent FOV segments;
    each of the image sensors in the plurality comprising respective sets of light sensitive elements;
    each of the image sensors in the plurality using a rolling capture technique to capture image data in a direction of traversal of its respective sets of light sensitive elements; and
    the first and second image sensors capturing image data in the first overlap area during a same overlap time period during which the first and second image sensors use opposite directions of traversal of their respective sets of light sensitive elements.

8. The system of claim 7 wherein the image sensors are homogeneous.

9. The system of claim 7 wherein the at least two image sensors are RGB image sensors.

10. The system of claim 7 wherein the first and second image sensors using opposite directions of traversal start the traversal for a frame at respective set of light sensitive elements of the first overlap area shared with the adjacent FOV segment.

11. The system of claim 7 wherein the first and second image sensors using opposite directions of traversal start the traversal for a frame at respective set of light sensitive elements at the non-overlapping edge of the field of view segment for each sensor and end in the first overlap area.

12. The system of claim 7 further comprising:
    one or more memory buffers accessible by each of the first and second image sensors to receive image data for each respective FOV segment; and
    a software controlled processor communicatively coupled to the one or more memory buffers for accessing the image data and performing one or more image error correction techniques using image data for the first overlap area from a plurality of FOV segments.

13. The system of claim 7 further comprising:
    a third image sensor covering a FOV segment adjacent to the FOV segment of the first image sensor and sharing a second overlap area with the first image sensor, the second overlap area covering a portion of the first overlap area; and
    the first and third image sensors capturing image data in the second overlap area during the same overlap time period during which the first and third image sensors use a same direction of traversal of their respective sets of light sensitive elements.

14. The system of claim 13 further comprising:
    a fourth image sensor covering a FOV segment adjacent to the FOV segment of the second image sensor and sharing a third overlap area with the second image sensor, a portion of the third overlap area covering a portion of the first overlap area and the second overlap area;
    the second and fourth image sensors capturing image data in the third overlap area during the same overlap time period during which the second and fourth image sensors use a same direction of traversal of their respective sets of light sensitive elements; and
    the portions of the first, second and third overlap areas covering each other forming an overlap intersection area.

15. In a system of image sensors using a scanning technique to capture image data, a method of image processing image data in an overlap area comprising:
    capturing image data in a first direction of traversal for a first overlap area of a first field of view (FOV) segment in an overlap time period, the first overlap area being shared with a second adjacent FOV segment; and
    capturing image data in a second direction of traversal opposite to the first direction of traversal for the first overlap area of the second FOV segment in the same overlap time period; and
    performing an image stitching technique to stitch together the image data from both FOV segments for the first overlap area.

16. The method of claim 15 wherein the scanning technique is a rolling capture technique.

17. The method of claim 15 wherein the scanning technique comprises a respective beam of light traversing each of the respective sets of light sensitive elements of each of the first, second, third and fourth image sensors in a scanning pattern; and the scanning pattern for each respective beam starts in a middle of the overlap intersection area.

18. The method of claim 15 further comprising:

capturing image data in the first direction of traversal for a second overlap area of a third FOV segment adjacent to the first FOV segment in the same overlap time period, the second overlap area being shared with the first adjacent FOV segment; and performing an image stitching technique to stitch together the image data from any combination of the first and third FOV segments for the second overlap area.

19. The method of claim 15 wherein performing the image stitching technique based on data from both FOV segments for the first overlap area comprises the step of blending data from the first FOV with data from the second FOV in the first overlap area.

20. The method of claim 19, the first overlap area including a first overlap boundary nearest a center of the first FOV segment and the first overlap area including a second overlap boundary nearest a center of the second FOV segment, the step of blending comprising the steps of:

weighting data from the first FOV segment higher than data from the second FOV segment at positions in the first overlap area nearer to the first overlap boundary than the second overlap boundary, weighting the data from the first and second FOV segments equally toward a center of the first overlap area between the first and second overlap boundaries, and weighting data from the second FOV segment higher than data from the first FOV segment at positions in the first overlap area nearer to the second overlap boundary than the first overlap boundary.

* * * * *